United States Patent
Brauer et al.

(10) Patent No.: US 10,402,688 B2
(45) Date of Patent: Sep. 3, 2019

(54) DATA AUGMENTATION FOR CONVOLUTIONAL NEURAL NETWORK-BASED DEFECT INSPECTION

(71) Applicant: KLA-Tencor Corporation, Milpitas, CA (US)

(72) Inventors: Bjorn Brauer, Beaverton, OR (US); Vijay Ramachandran, Sunnyvale, CA (US); Richard Wallingford, Forsyth, MO (US); Scott Allen Young, Soquel, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 70 days.

(21) Appl. No.: 15/720,272

(22) Filed: Sep. 29, 2017

(65) Prior Publication Data

US 2018/0157933 A1    Jun. 7, 2018

Related U.S. Application Data (60) Provisional application No. 62/430,925, filed on Dec. 7, 2016.

(51) Int. Cl.
| | |
|---|---|
| *G06K 9/00* | (2006.01) |
| *G06K 9/62* | (2006.01) |
| *G06T 7/00* | (2017.01) |
| *G06N 3/04* | (2006.01) |
| *G06N 3/08* | (2006.01) |

(52) U.S. Cl.
CPC ......... *G06K 9/6255* (2013.01); *G06K 9/6274* (2013.01); *G06N 3/0454* (2013.01); *G06T 7/001* (2013.01); *G06T 7/0004* (2013.01); *G06T 7/0008* (2013.01); *G06K 2209/19* (2013.01); *G06N 3/082* (2013.01); *G06T 2207/20021* (2013.01); *G06T 2207/20084* (2013.01); *G06T 2207/30148* (2013.01)

(58) Field of Classification Search
None
See application file for complete search history.

(56) References Cited

U.S. PATENT DOCUMENTS

| | | | |
|---|---|---|---|
| 9,830,526 B1 * | 11/2017 | Lin | ........................ G06K 9/6298 |
| 2011/0007961 A1 * | 1/2011 | Iwanaga | ............. G01N 21/8851 |
| | | | 382/149 |

(Continued)

FOREIGN PATENT DOCUMENTS

JP    2000232138 A    8/2000

OTHER PUBLICATIONS

ISA/KR, International Search Report for PCT/US2017/064947 dated Mar. 29, 2018.

*Primary Examiner* — Feng Niu
(74) *Attorney, Agent, or Firm* — Hodgson Russ LLP (57) ABSTRACT

Systems and methods for providing an augmented input data to a convolutional neural network (CNN) are disclosed. Wafer images are received at a processor. The wafer image is divided into a plurality of references images each associated with a die in the wafer image. Test images are received. A plurality of difference images are created by differences the test images with the reference images. The reference images and difference images are assembled into the augmented input data for the CNN and provided to the CNN.

18 Claims, 4 Drawing Sheets

(56) References Cited

U.S. PATENT DOCUMENTS

| | | | |
|---|---|---|---|
| 2012/0176532 A1* | 7/2012 | Hara | G03B 13/36 |
| | | | 348/352 |
| 2014/0376802 A1* | 12/2014 | Wu | G06T 7/001 |
| | | | 382/149 |
| 2015/0070713 A1* | 3/2015 | McIntyre | G03F 1/82 |
| | | | 356/625 |
| 2015/0356233 A1 | 12/2015 | Fouquet et al. | |
| 2016/0109381 A1 | 4/2016 | Pavani | |
| 2016/0110859 A1 | 4/2016 | Luoh et al. | |
| 2016/0163035 A1 | 6/2016 | Chang et al. | |
| 2017/0163884 A1* | 6/2017 | Kobayashi | G01J 1/12 |
| 2018/0060702 A1* | 3/2018 | Ma | G06K 9/6269 |
| 2018/0253836 A1* | 9/2018 | Huang | G06T 7/00 |

\* cited by examiner

Fig. 1
(Prior Art)

☐ Defect image location
■ Reference image locations

DATA AUGMENTATION FOR CONVOLUTIONAL NEURAL NETWORK-BASED DEFECT INSPECTION

CROSS-REFERENCE TO RELATED APPLICATIONS

This application claims priority to U.S. Provisional Application No. 62/430,925, filed on Dec. 7, 2016, the disclosure of which is incorporated herein by reference.

FIELD OF THE DISCLOSURE

The present disclosure relates to defect inspection, for example, systems and methods of data augmentation for convolutional neural network-based defect inspection.

BACKGROUND OF THE DISCLOSURE

Fabricating semiconductor devices such as logic and memory devices typically includes processing a substrate such as a semiconductor wafer using a large number of semiconductor fabrication processes to form various features and multiple levels of the semiconductor devices. For example, lithography is a semiconductor fabrication process that involves transferring a pattern from a reticle to a resist arranged on a semiconductor wafer. Additional examples of semiconductor fabrication processes include, but are not limited to, chemical-mechanical polishing (CMP), etch, deposition, and ion implantation. Multiple semiconductor devices may be fabricated in an arrangement on a single semiconductor wafer and then separated into individual semiconductor devices.

Inspection processes are used at various steps during a semiconductor manufacturing process to detect defects on wafers to promote higher yield in the manufacturing process and thus higher profits. Inspection has always been an important part of fabricating semiconductor devices such as integrated circuits (ICs). However, as the dimensions of semiconductor devices decrease, inspection becomes even more important to the successful manufacture of acceptable semiconductor devices because smaller defects can cause the devices to fail. For instance, as the dimensions of semiconductor devices decrease, detection of defects of decreasing size has become necessary since even relatively small defects may cause unwanted aberrations in the semiconductor devices.

As design rules shrink, however, semiconductor manufacturing processes may be operating closer to the limitation on the performance capability of the processes. In addition, smaller defects can have an impact on the electrical parameters of the device as the design rules shrink, which drives more sensitive inspections. Therefore, as design rules shrink, the population of potentially yield relevant defects detected by inspection grows dramatically, and the population of nuisance defects detected by inspection also increases dramatically. Therefore, more and more defects may be detected on the wafers, and correcting the processes to eliminate all of the defects may be difficult and expensive. As such, determining which of the defects actually have an effect on the electrical parameters of the devices and the yield may allow process control methods to be focused on those defects while largely ignoring others. Furthermore, at smaller design rules, process induced failures may, in some cases, tend to be systematic. That is, process induced failures tend to fail at predetermined design patterns often repeated many times within the design. Elimination of spatially systematic, electrically relevant defects is important because eliminating such defects can have a significant overall impact on yield. Whether or not defects will affect device parameters and yield often cannot be determined from the inspection, review, and analysis processes described above since these processes may not be able to determine the position of the defect with respect to the electrical design.

One method to detect defects is to use computer vision. In computer vision, a model, such as a convolutional neural network (CNN) may be used to identify defects. A CNN may be provided with a variety of images from a wafer and a set of known defects. One of the most common tasks is to fit a model to a set of training data, with the goal of making reliable predictions on unseen test data. Usually one needs several hundred examples of each at a minimum. Very often this much data is not available or it takes too long to collect this data.

Figure 1:
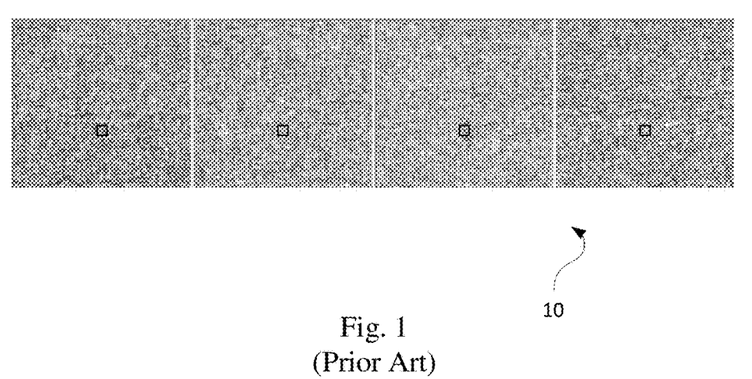
FIG. 1 is a plurality of difference images illustrating random wafer noise.

In addition, it is possible to overfit the CNN. In overfitting, a statistical model describes random error or noise instead of the underlying relationship. For example, FIG. 1 illustrates a plurality of images 10 showing wafer noise in difference images of adjacent dies. Overfitting occurs when a model is excessively complex, such as having too many parameters relative to the number of observations. A model that has been overfitted has poor predictive performance, as it overreacts to minor fluctuations in the training data.

Likewise, underfitting occurs when a statistical model or machine learning algorithm cannot capture the underlying trend of the data. Underfitting would occur, for example, when fitting a linear model to non-linear data. Such a model would have poor predictive performance.

The possibility of overfitting exists because the criterion used for training the model is not the same as the criterion used to judge the efficacy of a model. In particular, a model is typically trained by maximizing its performance on some set of training data. However, its efficacy is determined not by its performance on the training data but by its ability to perform well on unseen data. Overfitting occurs when a model begins to "memorize" training data rather than "learning" to generalize from a trend. As an extreme example, if the number of parameters is the same as or greater than the number of observations, a simple model or learning process can perfectly predict the training data simply by memorizing the training data in its entirety, but such a model will typically fail drastically when making predictions about new or unseen data, since the simple model has not learned to generalize at all.

The potential for overfitting depends not only on the number of parameters and data but also the conformability of the model structure with the data shape, and the magnitude of model error compared to the expected level of noise or error in the data.

In order to avoid overfitting, it is necessary to use additional techniques, such as data augmentation. Data augmentation takes existing data, such as existing wafer images, and applies mathematical functions to the data in order to create new, but similarly indicative images. For example, currently used data augmentation techniques include rotation, translation, zooming, flipping, and cropping of images.

However, these techniques cannot easily be used in the field of defect inspection. For example, rotation has only limited value as wafers can only be inspected in one or two orientations (0 and 90 degrees). Zoom is constant during the inspection process and thus is also of limited value. Translation, flipping, and cropping of images can be used, but these augmentations are often insufficient to generate enough augmentation data, especially when it comes to making the CNN robust to die-to-die or wafer-to-wafer process variation.

Furthermore, the prior art data augmentation techniques fall especially short when dealing with random wafer noise as illustrated in the difference images 10 of adjacent dies in FIG. 1. Augmenting the input data set with meaningful entirely random wafer noise is difficult, but should be taken into account when dealing with random process variation which is one of the most challenging wafer noise sources.

BRIEF SUMMARY OF THE DISCLOSURE

One embodiment of the present disclosure can be described as a method for providing an augmented input data to a convolutional neural network (CNN). The method comprises receiving a wafer image at a processor. The method further comprises dividing the wafer image into a plurality of reference images using the processor. Each reference image may be associated with a die in the wafer image. The method further comprises receiving one or more test images at the processor.

The method further comprises creating a plurality of difference images by differencing the one or more test images with one or more of the plurality of reference images using the processor. In one embodiment, the step of creating a plurality of difference images comprises differencing a test image with a median die reference image, a golden die reference image, a reference image based on a rendered design, or reference image from a same die row as the test image, a same die column as the test image, or any die in the wafer image.

The method further comprises assembling the plurality of reference images and the plurality of difference images into the augmented input data for the CNN using the processor. The method further comprises providing the augmented input data to the CNN.

In another embodiment, the method may further comprise performing a wafer scan using an image data acquisition subsystem. The image data acquisition subsystem converts the wafer scan into the wafer image and one or more test images.

In one embodiment, the method further comprises creating a plurality of defect-of-interest (DOI) images by differencing one or more test images having a DOI with one or more of the plurality of the reference images and merging the differenced images with one or more of the plurality of test images. The plurality of DOI images is assembled into the augmented input data for the CNN.

In another embodiment, the method may further comprise creating a plurality of transposed images, using the processor, by transposing the plurality of reference images and the plurality of difference images with respect to the received one or more test images. The plurality of transposed images are assembled into the augmented input data for the CNN. The plurality of transposed images may be transposed by a sub-pixel offset with respect to the received one or more test images.

In one embodiment, the method may further comprise creating a plurality of amplified images, using the processor, by multiplying pixel values of the plurality of reference images and the plurality of difference images by a constant or matrix. The plurality of amplified images are assembled into the augmented input data for the CNN.

In another embodiment, the method further comprises, using the processor, generating an electromagnetic simulation of the wafer image, rendering the electromagnetic simulation, combining the rendered electromagnetic simulation with the received wafer image to create an electromagnetic image, dividing the electromagnetic image into a plurality of electromagnetic reference images, and assembling the plurality of electromagnetic reference images into the augmented input data for the CNN. Each electromagnetic reference image may be associated with a die in the electromagnetic image.

In one embodiment, the method further comprises creating a plurality of defocused images by defocusing the plurality of reference images and the plurality of difference images using the processor. The plurality of defocused images are assembled into the augmented input data for the CNN.

In another embodiment, the method further comprises creating a plurality of illuminated images by varying an illumination value of the plurality of reference images and the plurality of difference images. The plurality of illuminated images are assembled into the augmented input data for the CNN.

Another embodiment of the present disclosure may be described as a system for providing an augmented input data to a CNN. The system may comprise a processor configured to execute one or more software modules. The one or more software modules may be configured to receive a wafer image. The wafer image may contain one or more dies.

The one or more software modules may be configured to divide the wafer image into a plurality of reference images. Each reference image associated may be associated with a die in the wafer image. The one or more software modules may be configured to receive one or more test images and create a plurality of difference images by differencing the one or more test images with one or more of the plurality of reference images.

The one or more software modules may be configured to assemble the plurality of reference images and the plurality of difference images into the augmented input data for the CNN and provide the augmented input data to the CNN.

In one embodiment, the software modules are further configured to create a plurality of defect-of-interest (DOI) images by differencing one or more test images having a DOI with one or more of the plurality of the reference images. The differenced images are then merged with one or more of the plurality of test images. The plurality of DOI images are then assembled into the augmented input data for the CNN.

In another embodiment, the system further comprises an image data acquisition subsystem in electronic communication with the processor. In such an embodiment, the image data acquisition subsystem is configured to perform a wafer scan. The one or more software modules are further configured to convert the wafer scan into the one or more test images and the wafer scan into the wafer image.

In one embodiment, the one or more software modules are further configured to create a plurality of transposed images by transposing the plurality of reference images and the plurality of difference images with respect to the received one or more test images. The plurality of transposed images are assembled into the augmented input data for the CNN. The plurality of transposed images may be transposed by a sub-pixel offset with respect to the received one or more test images.

In another embodiment, the one or more software modules are further configured to create a plurality of amplified images by multiplying pixel values of the plurality of reference images and the plurality of difference images by a constant or matrix. The plurality of amplified images are assembled into the augmented input data for the CNN.

In one embodiment, the one or more software modules are further configured to generate an electromagnetic simulation of the wafer image, render the electromagnetic simulation, combine the rendered electromagnetic simulation with the received wafer image to create an electromagnetic image, divide the electromagnetic image into a plurality of electromagnetic reference images, and assemble the plurality of electromagnetic reference images into the augmented input data for the CNN. Each electromagnetic reference image may be associated with a die in the electromagnetic image.

In another embodiment, the one or more software modules are further configured to create a plurality of defocused images by defocusing the plurality of reference images and the plurality of difference images. The plurality of defocused images are assembled into the augmented input data for the CNN.

In one embodiment, the one or more software modules are further configured to create a plurality of illuminated images by varying an illumination value of the plurality of reference images and the plurality of difference images. The plurality of illuminated images are assembled into the augmented input data for the CNN.

In another embodiment, the one or more software modules are configured to create a plurality of difference images by differencing a test image with a median die reference image, a golden die reference image, a reference image based on a rendered design, or reference image from a same die row as the test image, a same die column as the test image, or any die in the wafer image.

The system may further comprise a database in electronic communication with the processor and the image data acquisition subsystem. The database may be configured to store the wafer image, the plurality of reference images, the one or more test images, and the plurality of difference images. In another embodiment, the database is also configured to store the CNN.

DESCRIPTION OF THE DRAWINGS

For a fuller understanding of the nature and objects of the disclosure, reference should be made to the following detailed description taken in conjunction with the accompanying drawings, in which.

DETAILED DESCRIPTION OF THE DISCLOSURE

Although claimed subject matter will be described in terms of certain embodiments, other embodiments, including embodiments that do not provide all of the benefits and features set forth herein, are also within the scope of this disclosure. Various structural, logical, process step, and electronic changes may be made without departing from the scope of the disclosure. Accordingly, the scope of the disclosure is defined only by reference to the appended claims.

As used herein, the term "wafer" generally refers to substrates formed of a semiconductor or non-semiconductor material. Examples of such a semiconductor or non-semiconductor material include, but are not limited to, monocrystalline silicon, gallium arsenide, and indium phosphide. Such substrates may be commonly found and/or processed in semiconductor fabrication facilities.

A wafer may include one or more layers formed upon a substrate. For example, such layers may include, but are not limited to, a resist, a dielectric material, and a conductive material. Many different types of such layers are known in the art, and the term wafer as used herein is intended to encompass a wafer including all types of such layers.

One or more layers formed on a wafer may be patterned or unpatterned. For example, a wafer may include a plurality of dies, each having repeatable patterned features. Formation and processing of such layers of material may ultimately result in completed devices. Many different types of devices such as ICs may be formed on a wafer, and the term wafer as used herein is intended to encompass a wafer on which any type of device known in the art is being fabricated. As used herein, the term "chip" may comprise a collection of ICs designed for a particular purpose.

Although embodiments are described herein with respect to wafers, it is to be understood that the embodiments may be used for another specimen such as a reticle, which may also be commonly referred to as a mask or a photomask. Many different types of reticles are known in the art, and the terms "reticle," "mask," and "photomask" as used herein are intended to encompass all types of reticles known in the art.

Detecting defects on a wafer may involve using one or more optics modes including performing a hot scan on the wafer using the one or more optics modes and one or more defect detection algorithms A "hot scan" generally refers to a scan/inspection of a wafer performed to detect defects on the wafer by applying relatively aggressive detection settings (e.g., thresholds substantially close to the noise floor). In this manner, the hot scan may be performed to collect inspection data about the wafer that will be used for the tuning process (optics selection and algorithm tuning). The goal of the hot scan is to detect a representative sample of all defect and nuisance types on the wafer in the selected mode(s).

Embodiments described herein may include multiple hot scans, for example, one hot scan for optics selection and another for parameter tuning. The hot scan performed for parameter selection may be performed using optical mode(s) that were selected for wafer inspection. Selecting the optical mode(s) may include optics selection with overall scoring, which automatically calculates a single number that specifies how "good" a mode or combination of optics modes is at finding DOI while suppressing nuisance for a given set of defects. This eliminates the work of manually comparing the signal-to-noise ratio defect by defect across many modes and significantly reduces the optics selection time.

Embodiments described herein may utilize a set of processor nodes that is configured to generate an image of the wafer using the image data stored in the arrays of the storage media and at least one additional source of data for the wafer.

Embodiments of the present disclosure use convolutional neural networks for defect inspection. Conventional machine learning approaches (such as supervised learning) can also be used for defect inspection. In addition, the CNN may be used for defect classification during runtime. Embodiments of the present disclosure may introduce new techniques for the augmentation of input data sets for defect inspection, especially to mimic random die-to-die process variations.

A CNN is a type of feed-forward artificial neural network in which the connectivity pattern between its neurons (i.e., pixel clusters) is inspired by the organization of the animal visual cortex. Individual cortical neurons respond to stimuli in a restricted region of space known as the receptive field. The receptive fields of different neurons partially overlap such that they tile the visual field. The response of an individual neuron to stimuli within its receptive field can be approximated mathematically by a convolution operation.

CNNs may comprise of multiple layers of receptive fields. These are small neuron collections which process portions of the input image or images. The outputs of these collections are then tiled so that their input regions overlap, to obtain a better representation of the original image. This may be repeated for every such layer. Tiling allows CNNs to tolerate translation of the input image. CNN may have a 3D volumes of neurons. The layers of a CNN may have neurons arranged in three dimensions: width, height and depth. The neurons inside a layer are only connected to a small region of the layer before it, called a receptive field. Distinct types of layers, both locally and completely connected, are stacked to form a CNN architecture. CNNs exploit spatially local correlation by enforcing a local connectivity pattern between neurons of adjacent layers. The architecture thus ensures that the learnt filters produce the strongest response to a spatially local input pattern. Stacking many such layers leads to non-linear filters that become increasingly global (i.e., responsive to a larger region of pixel space). This allows the network to first create good representations of small parts of the input, then assemble representations of larger areas from them. In CNNs, each filter is replicated across the entire visual field. These replicated units share the same parameterization (weight vector and bias) and form a feature map. This means that all the neurons in a given convolutional layer detect exactly the same feature. Replicating units in this way allows for features to be detected regardless of their position in the visual field, thus constituting the property of translation invariance.

Together, these properties allow convolutional neural networks to achieve better generalization on vision problems. Weight sharing also helps by dramatically reducing the number of free parameters being learnt, thus lowering the memory requirements for running the network. Decreasing the memory footprint allows the training of larger, more powerful networks. CNNs may include local or global pooling layers, which combine the outputs of neuron clusters. Pooling layers may also consist of various combinations of convolutional and fully connected layers, with pointwise nonlinearity applied at the end of or after each layer. A convolution operation on small regions of input is introduced to reduce the number of free parameters and improve generalization. One advantage of convolutional networks is the use of shared weight in convolutional layers, which means that the same filter (weights bank) is used for each pixel in the layer. This also reduces memory footprint and improves performance.

A CNN architecture may be formed by a stack of distinct layers that transform the input volume into an output volume (e.g., holding class scores) through a differentiable function. A few distinct types of layers may be used. The convolutional layer has a variety of parameters that consist of a set of learnable filters (or kernels), which have a small receptive field, but extend through the full depth of the input volume. During the forward pass, each filter may be convolved across the width and height of the input volume, computing the dot product between the entries of the filter and the input and producing a 2-dimensional activation map of that filter. As a result, the network learns filters that activate when they see some specific type of feature at some spatial position in the input. By stacking the activation maps for all filters along the depth dimension, a full output volume of the convolution layer is formed. Every entry in the output volume can thus also be interpreted as an output of a neuron that looks at a small region in the input and shares parameters with neurons in the same activation map.

When dealing with high-dimensional inputs such as images, it may be impractical to connect neurons to all neurons in the previous volume because such a network architecture does not take the spatial structure of the data into account. CNNs may exploit spatially local correlation by enforcing a local connectivity pattern between neurons of adjacent layers. For example, each neuron is connected to only a small region of the input volume. The extent of this connectivity is a hyperparameter called the receptive field of the neuron. The connections may be local in space (along width and height), but always extend along the entire depth of the input volume. Such an architecture ensures that the learnt filters produce the strongest response to a spatially local input pattern. In one embodiment, training the CNN includes using transfer learning to create hyperparameters for each CNN. Transfer learning may include training a CNN on a very large dataset and then use the trained CNN weights either as an initialization or a fixed feature extractor for the task of interest.

Three hyperparameters control the size of the output volume of the convolutional layer: the depth, stride and zero-padding. Depth of the output volume controls the number of neurons in the layer that connect to the same region of the input volume. All of these neurons will learn to activate for different features in the input. For example, if the first CNN Layer takes the raw image as input, then different neurons along the depth dimension may activate in the presence of various oriented edges, or blobs of color. Stride controls how depth columns around the spatial dimensions (width and height) are allocated. When the stride is 1, a new depth column of neurons is allocated to spatial positions only 1 spatial unit apart. This leads to heavily overlapping receptive fields between the columns, and also to large output volumes. Conversely, if higher strides are used then the receptive fields will overlap less and the resulting output volume will have smaller dimensions spatially. Sometimes it is convenient to pad the input with zeros on the border of the input volume. The size of this zero-padding is a third hyperparameter. Zero padding provides control of the output volume spatial size. In particular, sometimes it is desirable to exactly preserve the spatial size of the input volume.

In some embodiments, a parameter sharing scheme may be used in layers to control the number of free parameters. If one patch feature is useful to compute at some spatial position, then it may also be useful to compute at a different position. In other words, denoting a single 2-dimensional slice of depth as a depth slice, neurons in each depth slice may be constrained to use the same weights and bias.

Since all neurons in a single depth slice may share the same parametrization, then the forward pass in each depth slice of the layer can be computed as a convolution of the neuron's weights with the input volume. Therefore, it is common to refer to the sets of weights as a filter (or a kernel), which is convolved with the input. The result of this convolution is an activation map, and the set of activation maps for each different filter are stacked together along the depth dimension to produce the output volume.

Sometimes, parameter sharing may not be effective, for example, when the input images to a CNN have some specific centered structure, in which completely different features are expected to be learned on different spatial locations.

Another important concept of CNNs is pooling, which is a form of non-linear down-sampling. There are several non-linear functions to implement pooling among which max pooling is one. Max pooling partitions the input image into a set of non-overlapping rectangles and, for each such sub-region, outputs the maximum. Once a feature has been found, its exact location may not be as important as its rough location relative to other features. The function of the pooling layer may be to progressively reduce the spatial size of the representation to reduce the amount of parameters and computation in the network, and hence to also control overfitting. A pooling layer may be positioned in-between successive cony layers in a CNN architecture.

Another layer in a CNN may be a ReLU (Rectified Linear Units) layer. This is a layer of neurons that applies a non-saturating activation function. A ReLU layer may increase the nonlinear properties of the decision function and of the overall network without affecting the receptive fields of the convolution layer.

Finally, after several convolutional and/or max pooling layers, the high-level reasoning in the neural network is completed via fully connected layers. Neurons in a fully connected layer have full connections to all activations in the previous layer. Their activations can hence be computed with a matrix multiplication followed by a bias offset.

In some embodiments, dropout techniques may be utilized to prevent overfitting. As referred to herein, dropout techniques are a regularization technique for reducing overfitting in neural networks by preventing complex co-adaptations on training data. The term "dropout" refers to dropping out units (both hidden and visible) in a neural network. For example, at each training stage, individual nodes may be either "dropped out" of the CNN with probability 1-p or kept with probability p, so that a reduced CNN remains. In some embodiments, incoming and outgoing edges to a dropped-out node may also be removed. Only the reduced CNN is trained. Removed nodes may then be reinserted into the network with their original weights.

In training stages, the probability a hidden node will be retained (i.e. not dropped) may be approximately 0.5. For input nodes, the retention probability may be higher. By avoiding training all nodes on all training data, dropout decreases overfitting in CNNs and significantly improves the speed of training.

Many different types of CNNs may be used in embodiments of the present disclosure. Different CNNs may be used based on certain scanning modes or circumstances. The configuration of a CNN may change based on the wafer, image data acquisition subsystem, or predetermined parameters.

In one embodiment an image of a reticle generated by a reticle inspection system is used as image data in the image data space. In this manner an image of a reticle generated by a reticle inspection system may be used as a substitute for image data. The image of the reticle used in this embodiment may include any suitable image of the reticle generated in any suitable manner by any reticle inspection system known in the art. For example the image of the reticle may be a high magnification optical or electron beam image of the reticle acquired by a high magnification optical reticle inspection system or an electron beam based reticle inspection system respectively. Alternatively the image of the reticle may be an aerial image of the reticle acquired by an aerial imaging reticle inspection system.

In one embodiment, an inspection system is used to collect image data. For example, the optical and electron beam output acquisition subsystems described herein may be configured as inspection systems. In another embodiment, the image data acquisition subsystem is a defect review system. For example, the optical and electron beam output acquisition subsystems described herein may be configured as defect review systems. In a further embodiment, the image data acquisition subsystem is a metrology system. For example, the optical and electron beam output acquisition subsystems described herein may be configured as metrology systems. In particular, the embodiments of the output acquisition subsystems described herein and shown in FIG. 3 may be modified in one or more parameters to provide different imaging capability depending on the application for which they will be used. In one such example, the image data acquisition subsystem shown in FIG. 3 may be configured to have a higher resolution if it is to be used for defect review or metrology rather than for inspection. In other words, the embodiments of the image data acquisition subsystem shown in FIG. 3 describe some general and various configurations for an image data acquisition subsystem that can be tailored in a number of manners that will be obvious to one skilled in the art to produce output acquisition subsystems having different imaging capabilities that are more or less suitable for different applications.

The systems and methods of the present disclosure may utilize output acquisition subsystems, defect review output acquisition subsystems, and metrology image data acquisition subsystems that are configured for inspection, defect review, and metrology of specimens such as wafers and reticles. For example, the embodiments described herein may be configured for using both scanning electron microscopy (SEM) and optical images for the purposes of mask inspection, wafer inspection, and wafer metrology. In particular, the embodiments described herein may be installed on a computer node or computer cluster that is a component of or coupled to an image data acquisition subsystem such as a broadband plasma inspector, an electron beam inspector or defect review tool, a mask inspector, a virtual inspector, etc. In this manner, the embodiments described herein may generate output that can be used for a variety of applications that include, but are not limited to, wafer inspection, mask inspection, electron beam inspection and review, metrology, etc. The characteristics of the output acquisition subsystems shown in FIG. 3 can be modified as described above based on the specimen for which it will generate actual output.

Such a subsystem includes an image data acquisition subsystem that includes at least an energy source and a detector. The energy source is configured to generate energy that is directed to a wafer. The detector is configured to detect energy from the wafer and to generate output responsive to the detected energy.

Figure 3:
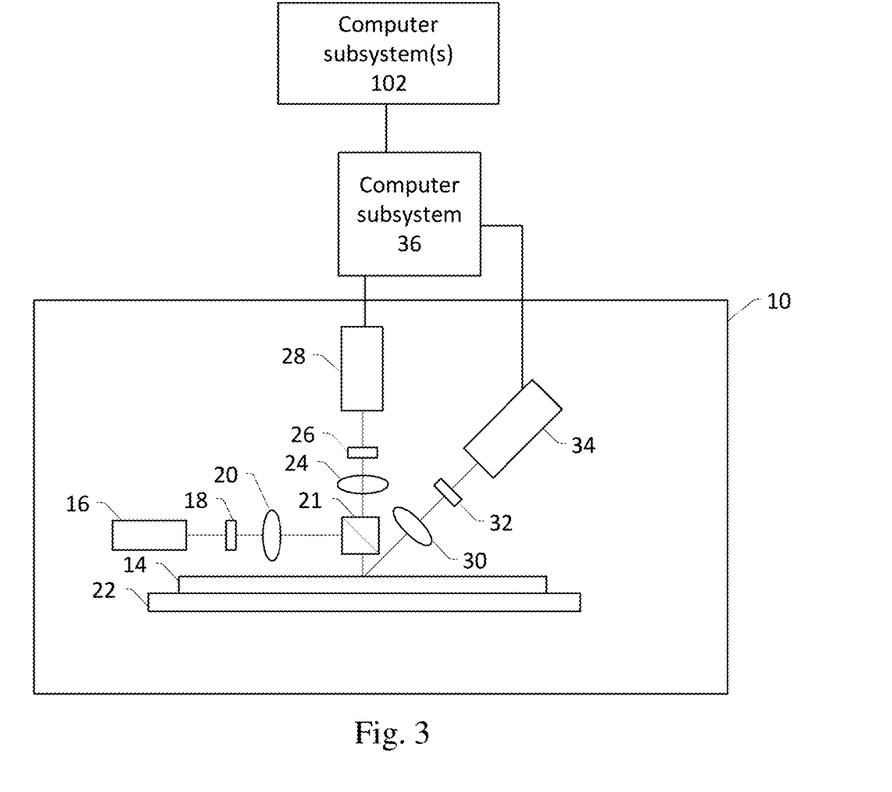
FIG. 3 is a system drawing of a system used in conjunction with one embodiment of the present disclosure.

In one embodiment, the energy directed to the wafer includes light, and the energy detected from the wafer includes light. For example, in the embodiment of the system shown in FIG. 3, image data acquisition subsystem 10 includes an illumination subsystem configured to direct light to wafer 14. The illumination subsystem includes at least one light source. For example, as shown in FIG. 3, the illumination subsystem includes light source 16. In one embodiment, the illumination subsystem is configured to direct the light to the wafer at one or more angles of incidence, which may include one or more oblique angles and/or one or more normal angles. For example, as shown in FIG. 3, light from light source 16 is directed through optical element 18 and then lens 20 to beam splitter 21, which directs the light to wafer 14 at a normal angle of incidence. The angle of incidence may include any suitable angle of incidence, which may vary depending on, for instance, characteristics of the wafer.

The illumination subsystem may be configured to direct the light to the wafer at different angles of incidence at different times. For example, the image data acquisition subsystem may be configured to alter one or more characteristics of one or more elements of the illumination subsystem such that the light can be directed to the wafer at an angle of incidence that is different than that shown in FIG. 3. In one such example, the image data acquisition subsystem may be configured to move light source 16, optical element 18, and lens 20 such that the light is directed to the wafer at a different angle of incidence.

In some instances, the image data acquisition subsystem may be configured to direct light to the wafer at more than one angle of incidence at the same time. For example, the illumination subsystem may include more than one illumination channel, one of the illumination channels may include light source 16, optical element 18, and lens 20 as shown in FIG. 3 and another of the illumination channels (not shown) may include similar elements, which may be configured differently or the same, or may include at least a light source and possibly one or more other components such as those described further herein. If such light is directed to the wafer at the same time as the other light, one or more characteristics (e.g., wavelength, polarization, etc.) of the light directed to the wafer at different angles of incidence may be different such that light resulting from illumination of the wafer at the different angles of incidence can be discriminated from each other at the detector(s).

In another instance, the illumination subsystem may include only one light source (e.g., source 16 shown in FIG. 3) and light from the light source may be separated into different optical paths (e.g., based on wavelength, polarization, etc.) by one or more optical elements (not shown) of the illumination subsystem. Light in each of the different optical paths may then be directed to the wafer. Multiple illumination channels may be configured to direct light to the wafer at the same time or at different times (e.g., when different illumination channels are used to sequentially illuminate the wafer). In another instance, the same illumination channel may be configured to direct light to the wafer with different characteristics at different times. For example, in some instances, optical element 18 may be configured as a spectral filter and the properties of the spectral filter can be changed in a variety of different ways (e.g., by swapping out the spectral filter) such that different wavelengths of light can be directed to the wafer at different times. The illumination subsystem may have any other suitable configuration known in the art for directing the light having different or the same characteristics to the wafer at different or the same angles of incidence sequentially or simultaneously.

In one embodiment, light source 16 may include a broadband plasma (BBP) light source. In this manner, the light generated by the light source and directed to the wafer may include broadband light. However, the light source may include any other suitable light source such as a laser. The laser may include any suitable laser known in the art and may be configured to generate light at any suitable wavelength or wavelengths known in the art. In addition, the laser may be configured to generate light that is monochromatic or nearly-monochromatic. In this manner, the laser may be a narrowband laser. The light source may also include a polychromatic light source that generates light at multiple discrete wavelengths or wavebands.

Light from optical element 18 may be focused to beam splitter 21 by lens 20. Although lens 20 is shown in FIG. 3 as a single refractive optical element, it is to be understood that, in practice, lens 20 may include a number of refractive and/or reflective optical elements that in combination focus the light from the optical element to the wafer. The illumination subsystem shown in FIG. 3 and described herein may include any other suitable optical elements (not shown). Examples of such optical elements include, but are not limited to, polarizing component(s), spectral filter(s), spatial filter(s), reflective optical element(s), apodizer(s), beam splitter(s), aperture(s), and the like, which may include any such suitable optical elements known in the art. In addition, the system may be configured to alter one or more of the elements of the illumination subsystem based on the type of illumination to be used for output acquisition.

The image data acquisition subsystem may also include a scanning subsystem configured to cause the light to be scanned over the wafer. For example, the image data acquisition subsystem may include stage 22 on which wafer 14 is disposed during output acquisition. The scanning subsystem may include any suitable mechanical and/or robotic assembly (that includes stage 22) that can be configured to move the wafer such that the light can be scanned over the wafer. In addition, or alternatively, the image data acquisition subsystem may be configured such that one or more optical elements of the image data acquisition subsystem perform some scanning of the light over the wafer. The light may be scanned over the wafer in any suitable fashion.

The image data acquisition subsystem further includes one or more detection channels. At least one of the one or more detection channels includes a detector configured to detect light from the wafer due to illumination of the wafer by the image data acquisition subsystem and to generate output responsive to the detected light. For example, the image data acquisition subsystem shown in FIG. 3 includes two detection channels, one formed by collector 24, element 26, and detector 28 and another formed by collector 30, element 32, and detector 34. As shown in FIG. 3, the two detection channels are configured to collect and detect light at different angles of collection. In some instances, one detection channel is configured to detect specularly reflected light, and the other detection channel is configured to detect light that is not specularly reflected (e.g., scattered, diffracted, etc.) from the wafer. However, two or more of the detection channels may be configured to detect the same type of light from the wafer (e.g., specularly reflected light). Although FIG. 3 shows an embodiment of the image data acquisition subsystem that includes two detection channels, the image data acquisition subsystem may include a different number of detection channels (e.g., only one detection channel or two or more detection channels). Although each of the collectors are shown in FIG. 3 as single refractive optical elements, it is to be understood that each of the collectors may include one or more refractive optical element(s) and/or one or more reflective optical element(s).

The one or more detection channels may include any suitable detectors known in the art. For example, the detectors may include photo-multiplier tubes (PMTs), charge coupled devices (CCDs), and time delay integration (TDI) cameras. The detectors may also include any other suitable detectors known in the art. The detectors may also include non-imaging detectors or imaging detectors. In this manner, if the detectors are non-imaging detectors, each of the detectors may be configured to detect certain characteristics of the scattered light such as intensity but may not be configured to detect such characteristics as a function of position within the imaging plane. As such, the output that is generated by each of the detectors included in each of the detection channels of the image data acquisition subsystem may be signals or data, but not image signals or image data. In such instances, a computer subsystem such as computer subsystem 36 of the system may be configured to generate images of the wafer from the non-imaging output of the detectors. However, in other instances, the detectors may be configured as imaging detectors that are configured to generate imaging signals or image data. Therefore, the system may be configured to generate the images described herein in a number of ways.

It is noted that FIG. 3 is provided herein to generally illustrate a configuration of an image data acquisition subsystem that may be included in the system embodiments described herein. Obviously, the image data acquisition subsystem configuration described herein may be altered to optimize the performance of the system as is normally performed when designing a commercial system. In addition, the systems described herein may be implemented using an existing output acquisition system (e.g., by adding functionality described herein to an existing output acquisition system) such as tools that are commercially available from KLA-Tencor. For some such systems, the methods described herein may be provided as optional functionality of the output acquisition system (e.g., in addition to other functionality of the output acquisition system). Alternatively, the system described herein may be designed "from scratch" to provide a completely new system.

Computer subsystem 36 of the system may be coupled to the detectors of the image data acquisition subsystem in any suitable manner (e.g., via one or more transmission media, which may include "wired" and/or "wireless" transmission media) such that the computer subsystem can receive the output generated by the detectors during scanning of the wafer. Computer subsystem 36 may be configured to perform a number of functions using the output of the detectors as described herein and any other functions described further herein. This computer subsystem may be further configured as described herein.

This computer subsystem (as well as other computer subsystems described herein) may also be referred to herein as computer system(s). Each of the computer subsystem(s) or system(s) described herein may take various forms, including a personal computer system, image computer, mainframe computer system, workstation, network appliance, Internet appliance, or other device. In general, the term "computer system" may be broadly defined to encompass any device having one or more processors, which executes instructions from a memory medium. The computer subsystem(s) or system(s) may also include any suitable processor known in the art such as a parallel processor. In addition, the computer subsystem(s) or system(s) may include a computer platform with high speed processing and software, either as a standalone or a networked tool.

If the system includes more than one computer subsystem, then the different computer subsystems may be coupled to each other such that images, data, information, instructions, etc. can be sent between the computer subsystems as described further herein. For example, computer subsystem 36 may be coupled to computer subsystem(s) 102 by any suitable transmission media, which may include any suitable wired and/or wireless transmission media known in the art. Two or more of such computer subsystems may also be effectively coupled by a shared computer-readable storage medium (not shown).

Figure 4:
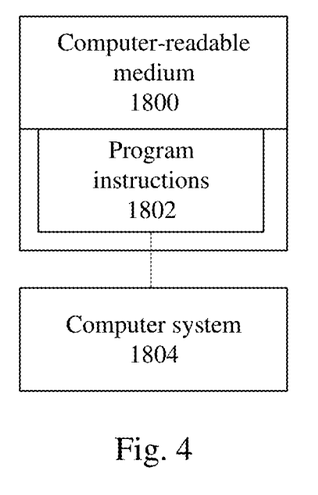
FIG. 4 is a diagram showing a non-transitory computer-readable medium storing program instructions executable on a computer system for performing a computer-implemented method of the present disclosure.

An additional embodiment relates to a non-transitory computer-readable medium storing program instructions executable on a computer system for performing a computer-implemented method for defect detection. One such embodiment is shown in FIG. 4. In particular, as shown in FIG. 4, non-transitory computer-readable medium 1800 includes program instructions 1802 executable on computer system 1804. The computer-implemented method may include any step(s) of any method(s) described herein.

Program instructions 1802 implementing methods such as those described herein may be stored on computer-readable medium 1800. The computer-readable medium may be a storage medium such as a magnetic or optical disk, a magnetic tape, or any other suitable non-transitory computer-readable medium known in the art.

The program instructions may be implemented in any of various ways, including procedure-based techniques, component-based techniques, and/or object-oriented techniques, among others. For example, the program instructions may be implemented using ActiveX controls, C++ objects, JavaBeans, Microsoft Foundation Classes ("MFC"), SSE (Streaming SIMD Extension) or other technologies or methodologies, as desired.

Computer system 1804 may be configured according to any of the embodiments described herein.

Figure 5:
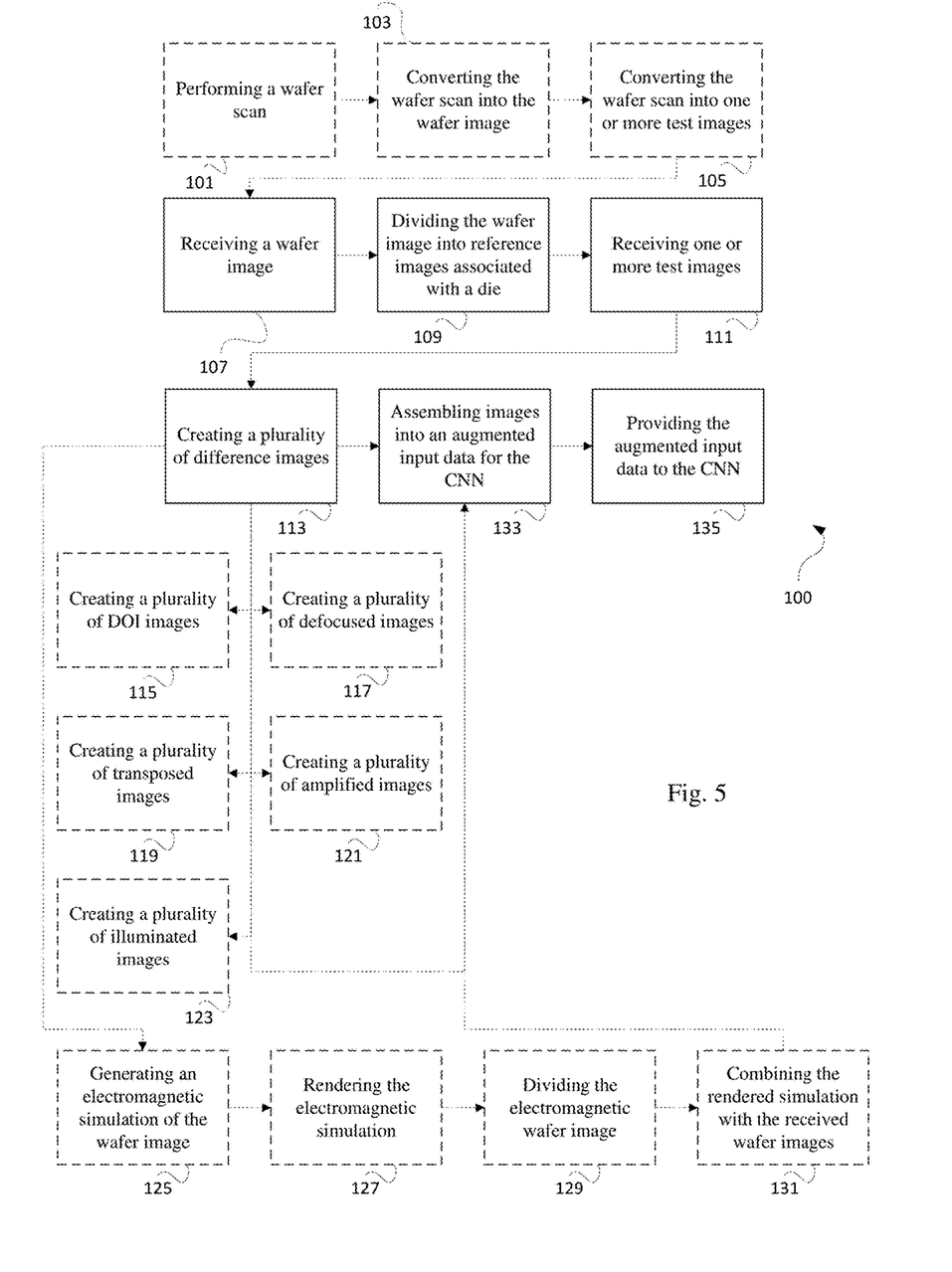
FIG. 5 is a flowchart illustrating one embodiment of the present disclosure.

In one embodiment of the present disclosure may be described as a method 100 for providing an augmented input data to a convolutional neural network (CNN), which is seen in FIG. 5. The augmented input data may comprise a plurality of training images or a plurality of training sets. The augmented input data may come in a variety of formats suitable for the CNN.

The method 100 comprises receiving 107 a wafer image at a processor. The wafer image may be a composite of images taken of the wafer during a scan or hot scan. The wafer image may also be a singular image that has been combined from a plurality of images taken of the wafer during a scanner hot scan. The wafer image is received 107 electronically, for example via a local area network or intranet. The wafer image may also be received 107 from a local or remote database.

Figure 2:
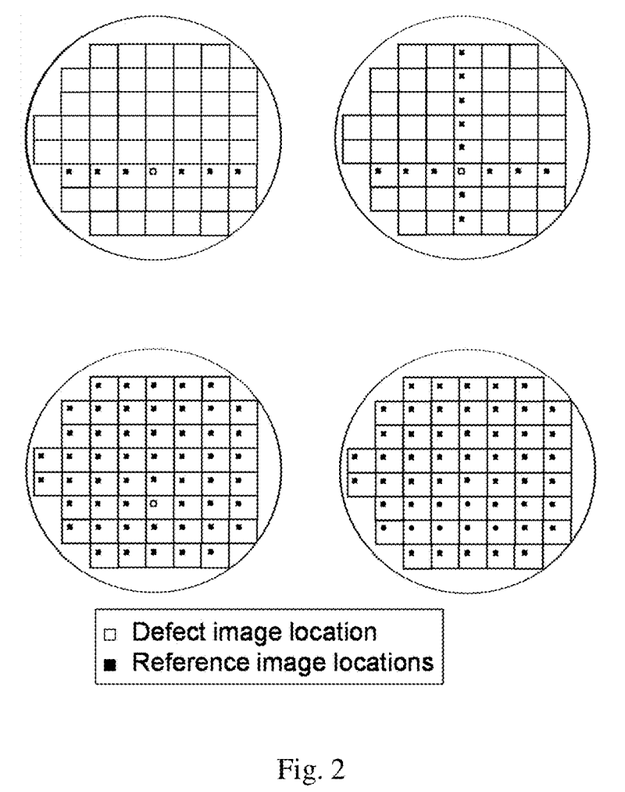
FIG. 2 is an illustration of reference image locations taken throughout a wafer.

The method 100 further comprises using the processor to divide 109 the wafer image into a plurality of reference images. Each reference image is associated with a die in the wafer image. FIG. 2 illustrates locations of reference images associated with each die in a wafer image. The wafer image may be divided 109 in predetermined segments, or the processor may select the size of each reference image. Each reference image may comprise a single die. The plurality of reference images may be stored in local memory, local database, or remote database. As such, the plurality of reference images may be retrieved by the processor for future use. Additional information may be associated with each of the plurality of reference images, such as wafer information, image location, image capture parameters, etc.

The method 100 further comprises receiving 111 one or more test images at the processor. The test images may be recently received 111 from a wafer or they may be test images that have been previously saved to an electronic data storage device. The test images may be images in which the user wishes to detect defects. Each test image may be of a single wafer. Additional information may be associated with each of the test images, such as wafer information, image location, image capture parameters, etc.

The method 100 further comprises creating 113 a plurality of difference images using the processor. The difference images are created by differencing the one or more test images with one or more of the plurality of reference images. In one embodiment, the difference between two images is calculated by finding the difference between each pixel in each image, and generating an image based on the result. The two images may need to be aligned so that the corresponding points coincide, and their photometric values can be made compatible, either by calibration or postprocessing (such as using color mapping). In one embodiment, the step of creating 113 a plurality of difference images may comprise differencing a test image with a median die reference image, a golden die reference image, a reference image based on a rendered design, or reference image from a same die row as a test image, a same die column as a test image, or any die in the wafer image.

In one embodiment, the one or more test images may be differenced with one or more of the plurality of reference images with corresponding die information. In another embodiment, the one or more test images may be differenced with one or more of the plurality of reference images with different die information. In some embodiments, multiple test images may be differenced with a single reference image or vice versa.

The method 100 further comprises assembling 133 the augmented input data for the CNN using the processor. The assembling 133 step may include packaging the plurality of reference images and the plurality of difference images into an electronic format suitable for input by the CNN. The assembling 133 step may include retrieving or storing reference images and difference images from local or remote electronic storage. The assembled 133 augmented input data may contain relevant information associated with each image, such as the die location, image capture parameters, etc.

The method 100 further comprises providing 135 the augmented input data to the CNN using the processor. In one embodiment, the CNN may be located and executed on the same processor. In another embodiment, the CNN may be located and executed on a remote processor. In one embodiment, the augmented input data may be provided 135 to an intermediary electronic storage medium such as RAM, ROM, or electronic database.

In one embodiment of the method 100, the method may further comprise performing 101 a wafer scan using image data acquisition subsystem. An exemplary embodiment of the image data acquisition subsystem is described above. The method 100 may further comprise converting 103 the wafer scan into a wafer image. The conversion 103 may occur at the image data acquisition subsystem or at a separate processor. The conversion 103 may include stitching together multiple images to create a wafer image. The conversion 103 may also include adjusting image parameters for a more suitable wafer image. The conversion 103 may also include converting the wafer scan into a computer readable electronic wafer image, such that the wafer image may be digitally manipulated by the embodiments of the present disclosure. The method 100 may further comprise converting 105 the wafer scan into the one or more test images. In addition to the potential conversion steps discussed above with regard to the wafer image conversion 103, the test image conversion 105 may further include segmenting the wafer image into a plurality of test images.

The segmentation may be based on die size automatically or based on a predetermined segmentation by the user or stored in memory.

In one embodiment of the method 100, the method may further comprise creating 115 a plurality of defect-of-interest (DOI) images. The DOI images are created 115 using the processor. The images 115 may be created by differencing one or more test images having a DOI with one or more of the plurality of the reference images and emerging the difference images with one or more of the plurality of test images. As such, new images are created 115 having a DOI transposed from a different test image. The plurality of DOI images are assembled 133 into the augmented input data for the CNN.

In another embodiment of the method 100, the method may further comprise creating 119 a plurality of transposed images using the processor. The transposed images are created 119 by transposing the plurality of reference images and the plurality of difference images with respect to the received one or more test images. For example, the transposition may be a sub pixel offset with respect to the received one or more test images. In another example, the transposition may be a multi-pixel offset with respect to the received one or more test images. The transposition for each reference image and difference image may be the same for the entire plurality or may be varied. The plurality of transposed images are assembled 133 into the augmented input data for the CNN.

In one embodiment of the method 100, the method may further comprise creating 121 a plurality of amplified images using the processor. The amplified images are created 121 by multiplying pixel values of the plurality of reference images and the plurality of difference images by a constant or a matrix. For example, the matrix may contain positive and negative values. In this way, certain features of the reference image or difference image may be amplified or reduced. The plurality of amplified images are assembled 133 into the augmented input data for the CNN.

In another embodiment of the method 100, the method may further comprise generating 125 an electromagnetic simulation of the wafer image using the processor. In some embodiments, the electromagnetic simulation may be generated 125 in a separate system or a different processor. Electromagnetic simulation may be generated 125 using known models or through postproduction analysis. The electromagnetic simulation may be rendered 127 using the processor. In some embodiments, the rendering may be stored in electronic memory or an internal or external electronic database. The electromagnetic simulation may be rendered 127 in such a way to mimic the visual effect of electromagnetic interference captured by the image data acquisition subsystem.

The rendered electromagnetic simulation may be combined 131 with the received wafer image to create an electromagnetic image. The combination 131 may be an addition of pixel values between the wafer image and the electromagnetic image. The electromagnetic image may be divided 129 into a plurality of electromagnetic reference images. Each electromagnetic reference image may be associated with a die in the electromagnetic image. In some embodiments, the division 129 may occur before the combination 131. In this way, computing power may be reduced because less than the full electromagnetic image may need to be combined 131 with the wafer image. The plurality of electromagnetic reference images are assembled 133 into the augmented input data for the CNN.

In another embodiment of the method 100, the method may further comprise creating 117 a plurality of defocused images using the processor. The defocused images are created 117 by the focusing the plurality of reference images and the plurality of difference images. Each reference image and difference image may be defocused using the same or different values. The plurality of defocused images are assembled 133 into the augmented input data for the CNN.

In another embodiment of the method 100, the method may further comprise creating 123 a plurality of illuminated images using the processor. The illuminated images 123 may be created by varying the illumination value of the plurality of reference images and the plurality of difference images. The illumination value may be separate from the pixel amplitude value. For example, a change in the illumination value may not result in an equal change in the amplitude of each pixel of a reference image or difference image. The amplitude change may be greater at an illumination point and lesser away from that point. The plurality of illuminated images are assembled 133 into the augmented input data for the CNN.

Another embodiment of the present disclosure may be described as a system for providing an augmented input data to a CNN. The system may comprise a processor configured to execute one or more software modules. The one or more software modules may be configured to receive a wafer image. The wafer image may contain one or more dies.

The one or more software modules may be configured to divide the wafer image into a plurality of reference images. Each reference image associated may be associated with a die in the wafer image. The one or more software modules may be configured to receive one or more test images and create a plurality of difference images by differencing the one or more test images with one or more of the plurality of reference images.

The one or more software modules may be configured to assemble the plurality of reference images and the plurality of difference images into the augmented input data for the CNN and provide the augmented input data to the CNN.

In one embodiment, the software modules are further configured to create a plurality of defect-of-interest (DOI) images by differencing one or more test images having a DOI with one or more of the plurality of the reference images. The differenced images are then merged with one or more of the plurality of test images. The plurality of DOI images are then assembled into the augmented input data for the CNN.

In another embodiment, the system further comprises an image data acquisition subsystem in electronic communication with the processor. In such an embodiment, the image data acquisition subsystem is configured to perform a wafer scan. The one or more software modules are further configured to convert the wafer scan into the one or more test images and the wafer scan into the wafer image.

In one embodiment, the one or more software modules are further configured to create a plurality of transposed images by transposing the plurality of reference images and the plurality of difference images with respect to the received one or more test images. The plurality of transposed images are assembled into the augmented input data for the CNN. The plurality of transposed images may be transposed by a sub-pixel offset with respect to the received one or more test images.

In another embodiment, the one or more software modules are further configured to create a plurality of amplified images by multiplying pixel values of the plurality of reference images and the plurality of difference images by a constant or matrix. The plurality of amplified images are assembled into the augmented input data for the CNN.

In one embodiment, the one or more software modules are further configured to generate an electromagnetic simulation of the wafer image, render the electromagnetic simulation, combine the rendered electromagnetic simulation with the received wafer image to create an electromagnetic image, divide the electromagnetic image into a plurality of electromagnetic reference images, and assemble the plurality of electromagnetic reference images into the augmented input data for the CNN. Each electromagnetic reference image may be associated with a die in the electromagnetic image.

In another embodiment, the one or more software modules are further configured to create a plurality of defocused images by defocusing the plurality of reference images and the plurality of difference images. The plurality of defocused images are assembled into the augmented input data for the CNN.

In one embodiment, the one or more software modules are further configured to create a plurality of illuminated images by varying an illumination value of the plurality of reference images and the plurality of difference images. The plurality of illuminated images are assembled into the augmented input data for the CNN.

In another embodiment, the one or more software modules are configured to create a plurality of difference images by differencing a test image with a median die reference image, a golden die reference image, a reference image based on a rendered design, or reference image from a same die row as the test image, a same die column as the test image, or any die in the wafer image.

The system may further comprise a database in electronic communication with the processor and the image data acquisition subsystem. The database may be configured to store the wafer image, the plurality of reference images, the one or more test images, and the plurality of difference images. In another embodiment, the database is also configured to store the CNN.

Although the present disclosure has been described with respect to one or more particular embodiments, it will be understood that other embodiments of the present disclosure may be made without departing from the spirit and scope of the present disclosure. Hence, the present disclosure is deemed limited only by the appended claims and the reasonable interpretation thereof.

What is claimed is:

1. A method for providing an augmented input data to a convolutional neural network (CNN) comprising:
   receiving, at a processor, a wafer image;
   dividing, using the processor, the wafer image into a plurality of reference images, each reference image associated with a die in the wafer image;
   receiving, at the processor, one or more test images;
   creating a plurality of difference images, using the processor, by differencing the one or more test images with one or more of the plurality of reference images;
   assembling, using the processor, the plurality of reference images and the plurality of difference images into the augmented input data for the CNN;
   providing, using the processor, the augmented input data to the CNN;
   creating a plurality of transposed images, using the processor, by transposing the plurality of reference images and the plurality of difference images with respect to the received one or more test images; and assembling, using the processor, the plurality of transposed images into the augmented input data for the CNN;

wherein the plurality of transposed images are transposed by a sub-pixel offset with respect to the received one or more test images.

2. The method of claim 1, further comprising:

performing, using an image data acquisition subsystem, a wafer scan;

converting, using an image data acquisition subsystem, the wafer scan into the wafer image; and converting, using the image data acquisition subsystem, the wafer scan into the one or more test images.

3. The method of claim 1, further comprising:

creating a plurality of defect-of-interest (DOI) images, using the processor, by differencing one or more test images having a DOI with one or more of the plurality of the reference images and merging the differenced images with one or more of the plurality of test images; and assembling, using the processor, the plurality of DOI images into the augmented input data for the CNN.

4. The method of claim 1, further comprising:

creating a plurality of amplified images, using the processor, by multiplying pixel values of the plurality of reference images and the plurality of difference images by a constant or matrix; and assembling, using the processor, the plurality of amplified images into the augmented input data for the CNN.

5. The method of claim 1, further comprising:

generating, using the processor, an electromagnetic simulation of the wafer image;

rendering, using the processor, the electromagnetic simulation;

combining, using the processor, the rendered electromagnetic simulation with the received wafer image to create an electromagnetic image;

dividing, using the processor, the electromagnetic image into a plurality of electromagnetic reference images, each electromagnetic reference image associated with a die in the electromagnetic image; and assembling, using the processor, the plurality of electromagnetic reference images into the augmented input data for the CNN.

6. The method of claim 1, further comprising:

creating a plurality of defocused images, using the processor, by defocusing the plurality of reference images and the plurality of difference images; and assembling, using the processor, the plurality of defocused images into the augmented input data for the CNN.

7. The method of claim 1, further comprising:

creating a plurality of illuminated images, using the processor, by varying an illumination value of the plurality of reference images and the plurality of difference images; and assembling, using the processor, the plurality of illuminated images into the augmented input data for the CNN.

8. The method of claim 1, wherein the step of creating a plurality of difference images comprises differencing, using the processor, a test image with a median die reference image, a golden die reference image, a reference image based on a rendered design, or reference image from a same die row as the test image, a same die column as the test image, or any die in the wafer image.

9. A system for providing an augmented input data to a convolutional neural network (CNN) comprising:

a processor configured to execute one or more software modules, the one or more software modules configured to:

receive a wafer image, the wafer image containing one or more dies;

divide the wafer image into a plurality of reference images, each reference image associated with a die in the wafer image;

receive one or more test images;

create a plurality of difference images by differencing the one or more test images with one or more of the plurality of reference images;

assemble the plurality of reference images and the plurality of difference images into the augmented input data for the CNN;

provide the augmented input data to the CNN;

create a plurality of transposed images by transposing the plurality of reference images and the plurality of difference images with respect to the received one or more test images; and assemble the plurality of transposed images into the augmented input data for the CNN;

wherein the plurality of transposed images are transposed by a sub-pixel offset with respect to the received one or more test images.

10. The system of claim 9, wherein the one or more software modules are further configured to:

create a plurality of defect-of-interest (DOI) images by differencing one or more test images having a DOI with one or more of the plurality of the reference images and merging the differenced images with one or more of the plurality of test images; and assemble the plurality of DOI images into the augmented input data for the CNN.

11. The system of claim 10, further comprising a database in electronic communication with the processor and the image data acquisition subsystem, the database configured to store the wafer image, the plurality of reference images, the one or more test images, and the plurality of difference images.

12. The system of claim 11, wherein the database is also configured to store the CNN.

13. The system of claim 9, further comprising:

an image data acquisition subsystem in electronic communication with the processor;

wherein the image data acquisition subsystem is configured to perform a wafer scan;

wherein the one or more software modules are further configured to convert the wafer scan into the one or more test images; and wherein the one or more software modules are further configured to convert the wafer scan into the wafer image.

14. The system of claim 9, wherein the one or more software modules are further configured to:

create a plurality of amplified images by multiplying pixel values of the plurality of reference images and the plurality of difference images by a constant or matrix; and assemble the plurality of amplified images into the augmented input data for the CNN.

15. The system of claim 9, wherein the one or more software modules are further configured to:

generate an electromagnetic simulation of the wafer image;

render the electromagnetic simulation;
combine the rendered electromagnetic simulation with the received wafer image to create an electromagnetic image;
divide the electromagnetic image into a plurality of electromagnetic reference images, each electromagnetic reference image associated with a die in the electromagnetic image; and
assemble the plurality of electromagnetic reference images into the augmented input data for the CNN.

16. The system of claim 9, wherein the one or more software modules are further configured to:
create a plurality of defocused images by defocusing the plurality of reference images and the plurality of difference images; and
assemble the plurality of defocused images into the augmented input data for the CNN.

17. The system of claim 9, wherein the one or more software modules are further configured to:
create a plurality of illuminated images by varying an illumination value of the plurality of reference images and the plurality of difference images; and
assemble the plurality of illuminated images into the augmented input data for the CNN.

18. The system of claim 9, wherein the one or more software modules are configured to create a plurality of difference images by differencing a test image with a median die reference image, a golden die reference image, a reference image based on a rendered design, or reference image from a same die row as the test image, a same die column as the test image, or any die in the wafer image.

* * * * *